(12) United States Patent
Koeck et al.

(10) Patent No.: US 12,552,149 B2
(45) Date of Patent: Feb. 17, 2026

(54) METHOD FOR JOINING ELECTRICAL STEEL LAMINATIONS AND DEVICE FOR CARRYING OUT SUCH A METHOD

(71) Applicant: HSP Hochspannungsgeräte GmbH, Troisdorf (DE)

(72) Inventors: Klaus Koeck, Hellmonsödt (AT); Klaus Pointner, Linz (AT)

(73) Assignee: HSP Hochspannungsgeräte GmbH, Troisdorf (DE)

( * ) Notice: Subject to any disclaimer, the term of this patent is extended or adjusted under 35 U.S.C. 154(b) by 0 days.

(21) Appl. No.: 18/638,948

(22) Filed: Apr. 18, 2024

(65) Prior Publication Data

US 2024/0351322 A1 Oct. 24, 2024

(30) Foreign Application Priority Data

Apr. 18, 2023 (EP) ..................................... 23168512

(51) Int. Cl.
| | |
|---|---|
| *B23K 20/00* | (2006.01) |
| *B32B 15/01* | (2006.01) |
| *B32B 37/06* | (2006.01) |
| *B32B 37/10* | (2006.01) |
| *B32B 37/12* | (2006.01) |
| *B32B 37/18* | (2006.01) |

(52) U.S. Cl.
CPC .............. *B32B 37/06* (2013.01); *B23K 20/00* (2013.01); *B32B 15/011* (2013.01); *B32B 37/1009* (2013.01); *B32B 37/12* (2013.01); *B32B 37/18* (2013.01); *B32B 2311/30* (2013.01)

(58) Field of Classification Search
CPC ... B32B 37/06; B32B 15/011; B32B 37/1009; B32B 37/12; B32B 37/18; B32B 2311/30; H02K 15/02; B23K 20/00–26
USPC ........ 228/179.1, 193–195, 233.1–235.3, 4.1, 228/6.1–6.2, 49.4
See application file for complete search history.

(56) References Cited

U.S. PATENT DOCUMENTS

| | | | | |
|---|---|---|---|---|
| 4,022,446 A | * | 5/1977 | Smith, Jr. ............... | F27D 11/02 373/113 |
| 4,691,857 A | * | 9/1987 | Friedman ............ | B21D 26/059 228/265 |

(Continued)

FOREIGN PATENT DOCUMENTS

| | | | | | |
|---|---|---|---|---|---|
| CN | 105583546 A | * | 5/2016 | ............. | B23K 31/12 |
| CN | 106346171 A | * | 1/2017 | ............. | B23K 37/00 |

(Continued)

*Primary Examiner* — Kiley S Stoner
(74) *Attorney, Agent, or Firm* — Laurence A. Greenberg; Werner H. Stemer; Ralph E. Locher

(57) ABSTRACT

A method for joining a multiplicity of electrical steel laminations to form a steel lamination stack includes stacking electrical steel laminations coated with an electrical steel coating and baking the electrical steel laminations together in the stack by applying pressure and heat. The steel lamination stack to be baked is inserted in a boiler in the form of a pressure vessel. The boiler is hermetically locked and in particular is completely filled with a liquid medium, whereupon the liquid medium is heated to a predetermined temperature, and the electrical steel laminations are baked together for a predetermined duration at a predetermined pressure. A device for carrying out the method is also provided.

13 Claims, 1 Drawing Sheet

(56) References Cited

U.S. PATENT DOCUMENTS

| | | | |
|---|---|---|---|
| 6,254,716 B1* | 7/2001 | Russell | B29C 66/8322 |
| | | | 156/286 |
| 6,629,358 B2 | 10/2003 | Setiabudi et al. | |
| 2003/0145943 A1* | 8/2003 | Lee | G02F 1/1341 |
| | | | 156/382 |
| 2003/0178467 A1* | 9/2003 | Lee | G02F 1/1339 |
| | | | 228/42 |
| 2003/0178468 A1* | 9/2003 | Lee | H01L 21/6838 |
| | | | 228/49.5 |
| 2015/0235851 A1* | 8/2015 | Broekaart | B32B 37/0007 |
| | | | 156/308.2 |

FOREIGN PATENT DOCUMENTS

| | | | | |
|---|---|---|---|---|
| CN | 107214411 A | * | 9/2017 | B23K 20/001 |
| CN | 109014481 A | * | 12/2018 | B23K 3/085 |
| JP | 61095789 A | * | 5/1986 | |
| WO | WO-2009064344 A1 | * | 5/2009 | B32B 38/004 |

\* cited by examiner

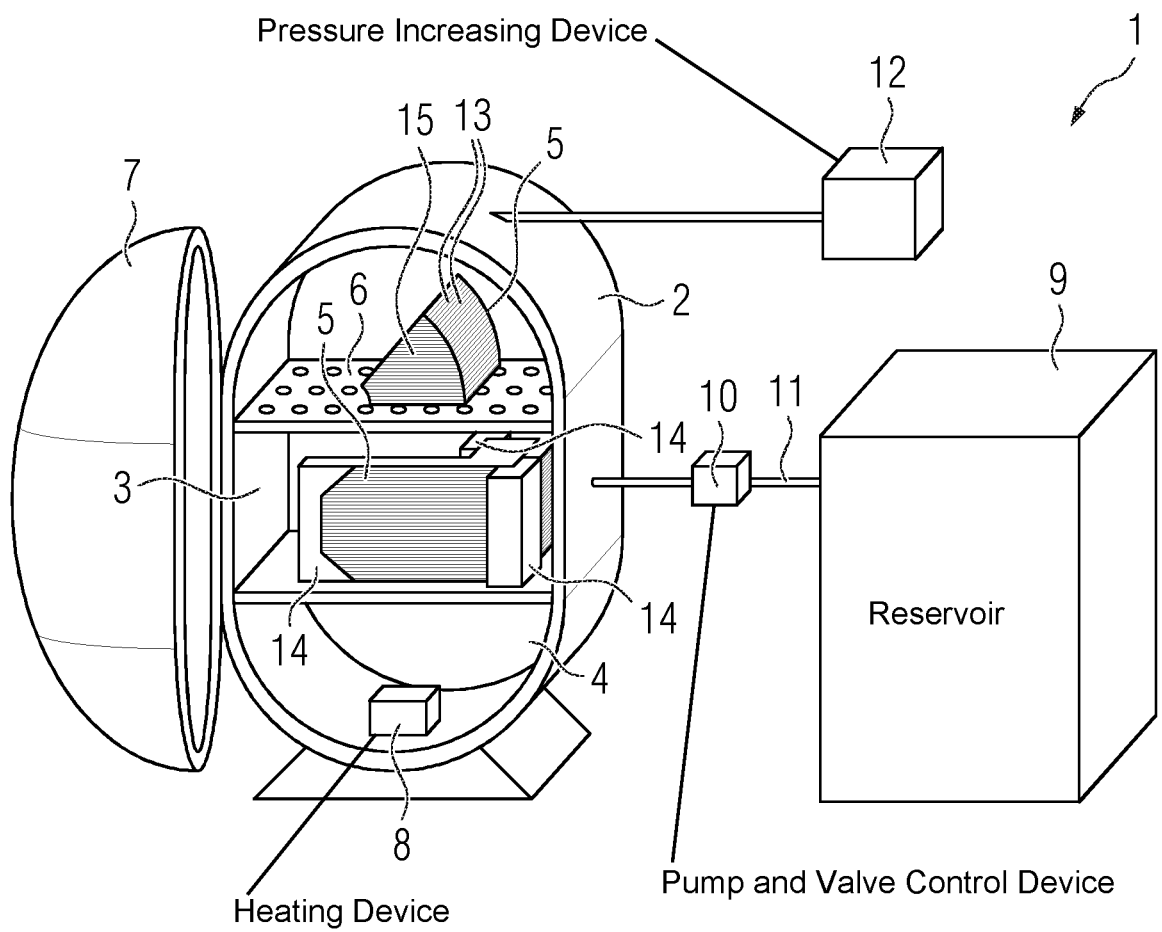

METHOD FOR JOINING ELECTRICAL STEEL LAMINATIONS AND DEVICE FOR CARRYING OUT SUCH A METHOD

CROSS-REFERENCE TO RELATED APPLICATION

This application claims the priority, under 35 U.S.C. § 119, of European Patent Application EP 23168512.4, filed Apr. 18, 2023, the prior application is herewith incorporated by reference in its entirety.

FIELD AND BACKGROUND OF THE INVENTION

The present invention relates to a method for joining a multiplicity of electrical steel sheets to form a steel lamination stack, in which electrical steel laminations coated with an electrical steel coating are stacked and, in the stack, are baked together by applying pressure and heat. The present invention further relates to a device for carrying out such a method.

In the prior art, it is known to produce magnetic circuits for electrical machines, which are also referred to as iron cores, from a multiplicity of electrical steel laminations joined to form a steel lamination stack. Bonding, welding, clamping and punching and stacking are used as joining methods. During bonding, the steel laminations are stacked, whereby adjacent electrical steel laminations are bonded with an adhesive over the entire surface thereof. During welding, the steel laminations are loosely stacked, after which they are usually interconnected from the outside by welds. During clamping, instead of welds, mechanical clamps are used, which encompass the electrical steel lamination stack from the outside and hold the stack together. During punching and stacking, the electrical steel lamination stacks stacked loosely one on top of the other are held together by tongue-and-groove connections. In recent years, the so-called Backlack (bonding varnish) process has become established, in which the electrical steel laminations are coated with an electrical steel varnish, also referred to as bonding varnish, then stacked and, in the stack, are baked together by applying pressure and heat. The temperature required to bake the electrical steel laminations is provided by a furnace into which the electrical steel laminations are inserted as a stack. The pressure required during the joining and the pressure required during the baking of the electrical steel laminations is achieved by pressing devices which apply pressure to the stacked electrical steel laminations during the baking process. As pressing devices, for example clamping bars which act on the steel lamination stack from the outside are used. It is also known to use extrusion billets which extend through through-openings provided in the electrical steel laminations. In order to prevent the required pressing forces from decreasing over the course of the baking process as a result of the lamination height shrinking, the pressing devices are usually paired with spring elements which are intended to compensate for the shrinking process. The bonding varnish, which softens when exposed to heat, sets as it cools, whereby the stacked electrical steel sheets are joined to form a solid stack. The pressing devices are removed after setting. A substantial advantage of the bonding varnish process resides in the fact that the individual electrical steel laminations are insulated from one another very well thanks to the baking over the entire surface thereof, and that prevents eddy current losses and short circuits. Furthermore, the electrical steel laminations do not fan out, as a result of which vibrations and noise generation are considerably reduced in comparison with the conventional methods. Moreover, very good stability and strength are achieved. Lastly, good protection against corrosion is provided, since moisture cannot get between the joined electrical steel sheets. However, one disadvantage of the bonding varnish process resides in the fact that, in the case of conventional pressing devices with more complex geometries, such as in the case of segments of a circle, core disks, pole shoes or graduated elements, constant pressing pressures cannot be achieved over the surfaces of the electrical steel laminations, and therefore the method is not suitable for all geometries. Compensating for the shrinking by using spring elements is also very challenging, which is frequently associated with suboptimal work results as well.

SUMMARY OF THE INVENTION

It is accordingly an object of the invention to provide an alternative method for joining electrical steel laminations and a device for carrying out such a method, which overcome at least some of the hereinafore-mentioned disadvantages of the heretofore-known methods and devices of this general type.

With the foregoing and other objects in view there is provided, in accordance with the invention, a method for joining a multiplicity of electrical steel laminations to form a steel lamination stack, in which electrical steel laminations coated with an electrical steel coating are stacked and, in the stack, are baked together by applying pressure and heat, wherein the steel lamination stack to be baked is inserted in a boiler in the form of a pressure vessel, the boiler is hermetically locked and in particular is completely filled with a liquid medium, whereupon the liquid medium is heated to a predetermined temperature, and the electrical steel laminations are baked together for a predetermined duration at a predetermined pressure.

The method according to the invention is performed in such a way that the baking process is carried out inside a boiler filled with a liquid medium. By heating the liquid medium, the temperature required for the baking process is provided. As the temperature increases, the pressure inside the boiler also increases, which acts on the stacked electrical steel laminations in a constant and uniform manner for the entire duration of the joining process. The use of conventional pressing devices is accordingly not required. The pressing forces generated by the excess pressure are also not impaired by the laminate height shrinking over the course of the baking process. As a result, electrical steel lamination stacks which are joined in an optimal manner by the method according to the invention can be produced.

The liquid medium is preferably water, wherein many other liquid media are of course also suitable. However, water is preferred due to the availability and environmental safety thereof.

According to one embodiment of the present invention, the stacked electrical steel laminations are pre-stuck together before being inserted in the boiler, in particular using an adhesive. In this way, the desired orientation of the stacked electrical steel laminations to be joined is prevented from changing during the insertion in the boiler.

Preferably, the stacked electrical steel laminations are oriented relative to one another inside the boiler using separate support structures. The support structures follow in particular the outer contour of the electrical steel lamination stack in order to prevent the desired orientation from changing.

According to one embodiment of the method according to the invention, the stacked electrical steel laminations are welded into a foil before being inserted in the boiler. The foil is used firstly to maintain the desired orientation of the electrical steel lamination stack during insertion in the boiler. Secondly, the foil prevents direct contact between the electrical steel laminations and the liquid medium, thereby eliminating negative interactions between the electrical steel laminations and the liquid medium.

Advantageously, the predetermined temperature is in a range of from 150° C. to 250° C. Within this temperature range, the best results are achieved using electrical steel coatings that are currently available on the market.

Preferably, the predetermined pressure prevailing inside the boiler during the baking is in a range of from 5 to 30 bar. In principle, the strength of the steel lamination stack produced by the method according to the invention increases as the pressure increases. Pressures below 5 bar have led to suboptimal results. In the case of pressures above 30 bar, no more notable increases in strength could be observed.

According to one embodiment of the present invention, the pressure prevailing inside the boiler is increased to the predetermined pressure by a pressure-increasing device connected to the boiler. Temperature and pressure can be adjusted separately from one another by such a pressure-increasing device.

The predetermined duration is preferably in a range of between 20 minutes and 3 hours. In this case, the predetermined duration is dependent on the bonding varnish used as well as on the temperature and pressure.

With the objects of the invention in view, there is also provided a device for carrying out a method according to the invention, comprising a boiler in the form of a pressure vessel, having a receiving cavity for receiving a steel lamination stack to be baked which is accessible via a hermetically sealable loading opening, a reservoir for a liquid medium, which is connected to the receiving cavity by a line, a pump and valve control device which is configured to fill and optionally empty the receiving cavity with liquid medium from the reservoir, and a heating device which is configured to heat liquid medium present in the receiving cavity.

According to one embodiment of the present invention, the device includes a heating fluid cavity filled with a heating fluid, the heating device, the heating fluid cavity and the receiving cavity being disposed in such a way that the heating fluid is heated by the heating device, which fluid in turn releases the heat thereof to the liquid medium contained in the receiving cavity.

Advantageously, a pressure-increasing device connected to the receiving cavity is provided, which is configured to increase the pressure prevailing inside the receiving cavity.

Other features which are considered as characteristic for the invention are set forth in the appended claims.

Although the invention is illustrated and described herein as embodied in a method for joining electrical steel laminations and a device for carrying out such a method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURE

The FIGURE of the drawing is a diagrammatic, perspective view of a device according to one embodiment of the present invention which is used to carry out a method according to the invention.

DETAILED DESCRIPTION OF THE INVENTION

Referring now in detail to the single FIGURE of the drawing, there is seen a device 1, which is only shown very diagrammatically, and includes a boiler 2 in the form of a pressure vessel having a receiving cavity 3 and a heating fluid chamber 4 which is provided under the cavity and separated therefrom. The receiving cavity 3 which is used to receive steel or sheet metal lamination stacks 5 to be baked, and in the present case is divided into two levels located one above the other in a shelf-like structure, which levels are separated from one another by a perforated plate 6, is accessible via a loading opening which, in the present case, can be hermetically sealed by a door 7. The heating fluid chamber 4 receives a heating fluid which can be heated by a heating device 8. The heating device 8 can be a gas burner, a heating rod or the like. A reservoir 9 for a liquid medium is connected to the receiving cavity 3 by a line 11 provided with a pump and valve control device 10, the pump and valve control device 10 being configured to fill and empty the receiving cavity 3 with liquid medium from the reservoir 9. Furthermore, in the present case, the device 1 includes a pressure-increasing device 12 connected to the receiving cavity 3, which device is configured to increase the pressure prevailing inside the receiving cavity 3.

In the following, a method carried out by using the device 1 is described according to one embodiment of the present invention, which method is used to join a multiplicity of electrical steel or sheet metal laminations 13 to form a steel lamination stack.

In a first step, the steel lamination stacks to be baked are inserted in the receiving cavity 3 of the boiler 2, and the receiving cavity 3 is subsequently hermetically locked by closing the door 7. The steel lamination stacks each is formed of a multiplicity of electrical steel laminations 13 which are coated with a bonding varnish. In the present case, the bonding varnish is the bonding varnish EB 549 available from the company Rembrandtin, but in principle, other bonding varnishes can also be used. In order to maintain the orientation of the electrical steel laminations 13 lain one above the other during the joining process, the stacked electrical steel laminations 13 can be oriented relative to one another inside the boiler 2 using separate support structures 14, as shown in the drawing nearby the steel lamination stack disposed in the lower compartment of the receiving cavity 3. The stacked electrical steel laminations 13 can also be welded into a foil 15 before insertion in the boiler 2, as is shown by the steel lamination stack disposed in the upper compartment of the receiving cavity 3.

In another step, in the present embodiment of the method according to the invention, the receiving cavity 3 is completely filled with a liquid medium which is preferably water. Subsequently, the liquid medium is heated to a predetermined temperature by using the heating device 8, wherein the heating device 8 firstly heats the heating fluid, which in turn transmits the heat thereof to the liquid medium contained in the receiving cavity 3. During the heating of the liquid medium, the pressure inside the receiving cavity 3 also increases, which can be further increased by the pressure-increasing device 12 if desired.

After achieving a predetermined temperature and a predetermined pressure, the electrical steel laminations 13 are baked together in particular at a constant temperature and constant pressure for a predetermined duration.

After the predetermined duration has elapsed, the liquid medium is released from the receiving cavity 3, and the pressure is lowered to ambient pressure, whereupon the baked steel lamination stacks can be removed from the receiving cavity 3.

The predetermined temperature, the predetermined pressure and the predetermined duration are selected according to the bonding varnish being used, wherein the predetermined temperature is preferably in a range of from 150° C. to 250° C., and/or the predetermined pressure is preferably in a range of from 5 to 30 bar, and/or the predetermined duration is preferably in a range of between 20 minutes and 3 hours. Within these ranges, when carrying out tests according to DIN EN 1464, very good peel resistances could be achieved. In the present case, a predetermined temperature of 180° C., a predetermined pressure of 8 bar, and a predetermined duration of 110 minutes have been selected.

Although the invention has been illustrated and described in greater detail on the basis of the preferred exemplary embodiment, the invention is not restricted by the examples disclosed, and other variations may be derived therefrom by a person skilled in the art without departing from the scope of protection of the invention.

Irrespective of the grammatical gender of a specific term, persons with male, female, or other gender identity are also included.

The following is a summary list of reference numerals and the corresponding structure used in the above description of the invention:

1 Device
2 Boiler
3 Receiving cavity
4 Heating fluid chamber
5 Steel lamination stack
6 Perforated plate
7 Door
8 Heating device
9 Reservoir
10 Pump and valve control
11 Line
12 Pressure-increasing device
13 Electrical steel lamination
14 Support structure
15 Film or foil

The invention claimed is:

1. A device for joining a multiplicity of electrical steel laminations to form a steel lamination stack, the device comprising:
   a boiler configured as a pressure vessel, said boiler having a receiving cavity for receiving the steel lamination stacks to be baked, said receiving cavity being accessible through a hermetically sealable loading opening;
   a reservoir for a liquid medium;
   a line connecting said reservoir to said receiving cavity;
   a pump and valve control device configured to fill and optionally empty said receiving cavity with the liquid medium from said reservoir;
   a heating fluid chamber to be filled with a heating fluid; and
   a heating device configured to heat the liquid medium present in said receiving cavity;
   said heating device, said heating fluid chamber and said receiving cavity being disposed to cause the heating fluid to be heated by said heating device and to cause the heating fluid in turn to release heat of the heating fluid to the liquid medium contained in the receiving cavity.

2. A method for joining a multiplicity of electrical steel laminations to form a steel lamination stack, the method comprising:
   providing the device for joining a multiplicity of electrical steel laminations to form the steel lamination stack according to claim 1;
   stacking the electrical steel laminations coated with an electrical steel coating to form a stack;
   inserting the steel lamination stack to be baked into the boiler configured as a pressure vessel;
   hermetically locking the boiler and filling the boiler with a liquid medium;
   subsequently heating the liquid medium to a predetermined temperature; and
   baking the electrical steel laminations together in the stack by applying pressure and heat for a predetermined duration at a predetermined pressure.

3. The method according to claim 2, which further comprises completely filling the boiler with the liquid medium.

4. The method according to claim 2, which further comprises providing water as the liquid medium.

5. The method according to claim 2, which further comprises pre-sticking the stacked electrical steel laminations together before inserting the stacked electrical steel laminations in the boiler.

6. The method according to claim 5, which further comprises pre-sticking the stacked electrical steel laminations together by using an adhesive.

7. The method according to claim 2, which further comprises orienting the stacked electrical steel laminations relative to one another inside the boiler by using separate support structures.

8. The method according to claim 2, which further comprises welding the stacked electrical steel laminations into a foil before inserting the stacked electrical steel laminations in the boiler.

9. The method according to claim 2, which further comprises setting the predetermined temperature to be in a range of from 150° C. to 250° C.

10. The method according to claim 1, which further comprises setting the predetermined pressure prevailing inside the boiler during the baking to be in a range of from 5 to 30 bar.

11. The method according to claim 10, which further comprises increasing a pressure prevailing inside the boiler to the predetermined pressure by using a pressure-increasing device connected to the boiler.

12. The method according to claim 2, which further comprises setting the predetermined duration to be in a range of between 20 minutes and 3 hours.

13. The device according to claim 1, which further comprises a pressure-increasing device connected to said receiving cavity, said pressure-increasing device configured to increase a pressure prevailing inside said receiving cavity.

* * * * *